United States Patent
Park et al.

(10) Patent No.: US 9,645,449 B2
(45) Date of Patent: May 9, 2017

(54) CURVED DISPLAY DEVICE AND MANUFACTURING METHOD THEREOF

(71) Applicant: Samsung Display Co., Ltd., Yongin, Gyeonggi-Do (KR)

(72) Inventors: Eun-Kil Park, Cheonan-si (KR); Seung Ho Yang, Hwaseong-si (KR); Chang Il Tae, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 521 days.

(21) Appl. No.: 14/060,028

(22) Filed: Oct. 22, 2013

(65) Prior Publication Data
US 2014/0375936 A1 Dec. 25, 2014

(30) Foreign Application Priority Data

Jun. 19, 2013 (KR) ........................ 10-2013-0070299

(51) Int. Cl.
*G02F 1/1339* (2006.01)
*G02F 1/1362* (2006.01)

(52) U.S. Cl.
CPC ............... *G02F 1/13394* (2013.01); *G02F 2001/13396* (2013.01); *G02F 2001/13398* (2013.01); *G02F 2001/136222* (2013.01)

(58) Field of Classification Search
CPC ..... G02F 1/13394; G02F 2001/136222; G02F 1/133514; G02F 1/133371; G02F 2001/13396; G02F 2001/13398
See application file for complete search history.

(56) References Cited

U.S. PATENT DOCUMENTS

| 6,275,280 | B1* | 8/2001 | Kajita | G02F 1/13394 349/106 |
| 7,920,243 | B2* | 4/2011 | Lee | G02F 1/13394 349/106 |
| 8,031,151 | B2* | 10/2011 | Kang | G02F 1/13394 345/92 |
| 8,253,891 | B2* | 8/2012 | Yu | G02F 1/136209 349/106 |

(Continued)

FOREIGN PATENT DOCUMENTS

| JP | 2004126197 A | 4/2004 |
| JP | 2009115933 A | 5/2009 |

(Continued)

*Primary Examiner* — Dennis Y Kim
(74) *Attorney, Agent, or Firm* — Cantor Colburn LLP

(57) ABSTRACT

A curved display device includes a thin film transistor display unit including a first insulation substrate; a common electrode display unit disposed opposite to the thin film transistor display unit and including a second insulation substrate; a liquid crystal layer disposed between the thin film transistor display unit and the common electrode display unit; and a plurality of color filters disposed on the first insulation substrate or the second insulation substrate, where each color filter includes an overlapping compensation region, which overlaps an adjacent color filter, and a non-overlapping region, which does not overlap the adjacent color filter, the overlapping compensation region defines a stepped region having a step height with the non-overlapping region.

24 Claims, 10 Drawing Sheets

(56) References Cited

U.S. PATENT DOCUMENTS

| | | | | |
|---|---|---|---|---|
| 8,310,628 | B2* | 11/2012 | Sakata | B29D 11/00634 |
| | | | | 349/106 |
| 2008/0068537 | A1* | 3/2008 | Lee | G02F 1/136209 |
| | | | | 349/106 |
| 2009/0161048 | A1* | 6/2009 | Satake | G02F 1/133305 |
| | | | | 349/110 |
| 2009/0174832 | A1* | 7/2009 | Lee | G02F 1/13338 |
| | | | | 349/43 |
| 2011/0001910 | A1* | 1/2011 | Fujiyoshi | G02F 1/13394 |
| | | | | 349/106 |
| 2011/0085126 | A1 | 4/2011 | Kajiyama et al. | |
| 2011/0216276 | A1* | 9/2011 | Yang | G02F 1/1335 |
| | | | | 349/108 |
| 2012/0138653 | A1* | 6/2012 | Kim | B26F 3/002 |
| | | | | 225/2 |
| 2014/0098332 | A1* | 4/2014 | Kim | G02F 1/133512 |
| | | | | 349/106 |

FOREIGN PATENT DOCUMENTS

| | | |
|---|---|---|
| KR | 1020050065828 A | 6/2005 |
| KR | 100764292 B2 | 9/2007 |
| KR | 1020090115523 A | 11/2009 |
| KR | 1020100104189 A | 9/2010 |
| KR | 1020100113369 A | 10/2010 |
| KR | 1020110002844 | 1/2011 |
| KR | 1020110038917 A | 4/2011 |
| KR | 1020110083412 A | 7/2011 |
| KR | 101074393 B1 | 10/2011 |

* cited by examiner

CURVED DISPLAY DEVICE AND MANUFACTURING METHOD THEREOF

This application claims priority to Korean Patent Application No. 10-2013-0070299, filed on Jun. 19, 2013, and all the benefits accruing therefrom under 35 U.S.C. §119, the content of which in its entirety is herein incorporated by reference.

BACKGROUND (a) Technical Field

Exemplary embodiments of the invention relates to a curved display device and a manufacturing method of the curved display device, and more particularly, to a curved display device, in which an interval between display units is maintained to be substantially constant through a height of a stepped region of a color filter that varies by a stress thereon.

(b) Description of the Related Art

A liquid crystal display, which is one of the most widely used types of flat display, typically includes two display units on which an electric field generating electrode, such as a pixel electrode and a common electrode, is formed, and a liquid crystal layer disposed therebetween. The liquid crystal display generates an electric field on the liquid crystal layer by applying voltage to the electric field generating electrode, determines a direction of liquid crystal molecules of the liquid crystal layer through the generated electric field, and displays an image by controlling polarization of incident light.

The liquid crystal display may be used as a display device of a television receiver, which has a substantially large sized screen. When the size of the liquid crystal display is substantially large, a difference in the visual field increases when a viewer views a center portion of the screen and when the viewer views both left and right ends of the screen.

To compensate for such difference in the visual field, a display device may have a curved shape by bending the display device to be in a concave shape or a convex shape. The display device may be provided in a portrait type having a vertical length longer than a horizontal length and bent in a vertical direction based on the viewer, and may be provided in a landscape type having a vertical length shorter than a horizontal length and bent in a horizontal direction, based on the viewer.

However, in such a liquid crystal display having a curved shape by bending the liquid crystal display, a shear stress is applied to a substrate positioned to be inward of a curved surface between two substrates. Accordingly, an interval between the two substrate may not be substantially constantly maintained.

SUMMARY

Exemplary embodiments of the invention provide a curved display device, in which an interval of a region, on which a shear stress is concentrated, is effectively maintained.

An exemplary embodiment of the invention provides a curved display device, including: a thin film transistor display unit including a first insulation substrate; a common electrode display unit disposed opposite to the thin film transistor display unit and including a second insulation substrate; a liquid crystal layer disposed between the thin film transistor display unit and the common electrode display unit; and a plurality of color filters disposed on the first insulation substrate or the second insulation substrate, where each color filter includes an overlapping compensation region, which overlaps an adjacent color filter, and a non-overlapping region, which does not overlap the adjacent color filter, the overlapping compensation region defines a stepped region having a step height with the non-overlapping region.

In an exemplary embodiment, the step height corresponds to a stress thereon.

In an exemplary embodiment, the step height of the stepped region may be calculated based on the following equation:

$$A = \frac{B}{0.1} - 4.5,$$

where A denotes a value of the stress expressed in kilogram force, and B denotes a value of the step height expressed in micrometer.

In an exemplary embodiment, the step height of the stepped region may be in a range of about 1.2 micrometers (μm) to about 1.9 micrometers (μm).

In an exemplary embodiment, a ratio of an interval between the thin film transistor display unit and the common electrode display unit with respect to the step height of the stepped region may be in a range of about 0.4 to about 0.6.

In an exemplary embodiment, the interval between the thin film transistor display unit and the common electrode display unit may be in a range of about 0.3 μm to about 0.9 μm.

In an exemplary embodiment, the curved display device may further include a fixing member configured to maintain an interval between the thin film transistor display unit and the common electrode display unit, where the step height of the stepped region may gradually vary based on the fixing member.

In an exemplary embodiment, the stress may be concentrated in a longitudinal direction of the curved display device from a position at which the fixing member is disposed.

In an exemplary embodiment, the curved display device may further include a thin film transistor element disposed on the first insulation substrate, and a main column spacer disposed between the first insulation substrate and the second insulation substrate and in a position at which the thin film transistor element is disposed.

In an exemplary embodiment, the color filter may include a step compensation region, and the curved display device may further include a sub-column spacer positioned on the step compensation region.

In an exemplary embodiment, each color filter may include a plurality of overlapping compensation regions.

In an exemplary embodiment, an interval between the thin film transistor display unit and the common electrode display unit may be substantially constant.

In an exemplary embodiment, the second insulation substrate may be disposed to be inward based on a curvature radius, and the second insulation substrate may be less compressed in a longitudinal direction of the curved display device than the first insulation substrate.

Another exemplary embodiment of the invention provides a curved display device, including: a thin film transistor display unit including a first insulation substrate; a common electrode display unit disposed opposite to the thin film transistor display unit, and including a second insulation substrate; a liquid crystal layer disposed between the thin film transistor display unit and the common electrode display unit; a plurality of color filters disposed on the first insulation substrate or the second insulation substrate, where each color filter includes an overlapping compensation region, which overlaps an adjacent color filter, and a non-overlapping region, which does not overlap the adjacent color filter; and a light blocking member disposed adjacent to the color filter and overlapping the overlapping compensation region, where the light blocking member and the overlapping compensation region, which overlap each other, defines a stepped region having a step height with the non-overlapping region.

Still another exemplary embodiment of the invention provides a display manufacturing method of a curved display device, the method including: providing a thin film transistor display unit including a first insulation substrate and a plurality of color filters; providing a common electrode display unit including a second insulation substrate and a common electrode to be opposite to the thin film transistor display unit; and providing liquid crystal between the thin film transistor display unit and the common electrode display unit that face each other, where adjacent color filters of the color filters overlap each other such that an overlapping compensation region is provided between the adjacent color filters, and the overlapping region defines a stepped region having a step height with a non-overlapping region of the color filters.

In an exemplary embodiment, the method may further include providing a thin film transistor element on the first insulation substrate; and providing a main column spacer between the first insulation substrate and the second insulation substrate and in a position at which the thin film transistor element is provided.

In an exemplary embodiment, the method may further include providing a step compensation region using the color filter; and providing a sub-column spacer on the step compensation region.

According to exemplary embodiments of the curved display device, an interval between display units in a region on which a stress is concentrated is effectively maintained to be substantially constant, thereby improving display quality thereof.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
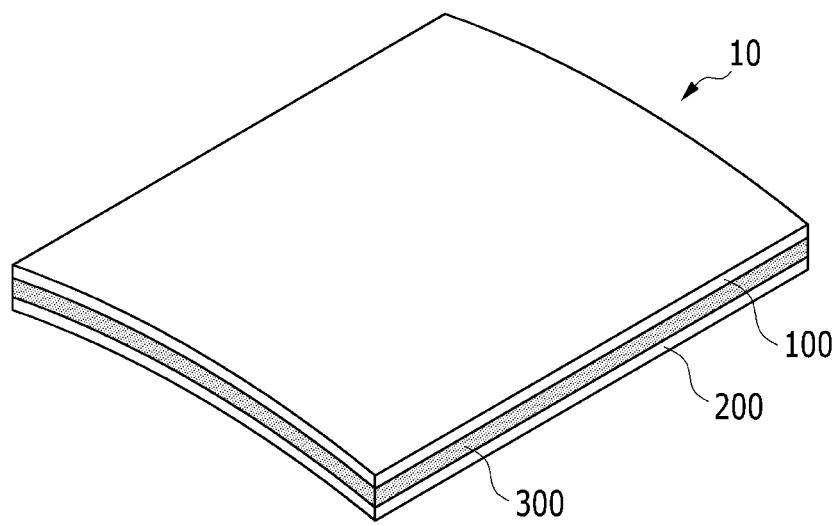
FIG. 1 is a perspective view of an exemplary embodiment of a curved display device according to an exemplary embodiment of the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, an exemplary embodiment of a curved display device according to the invention will be described with reference to FIGS. 1 through 8.

Figure 2:
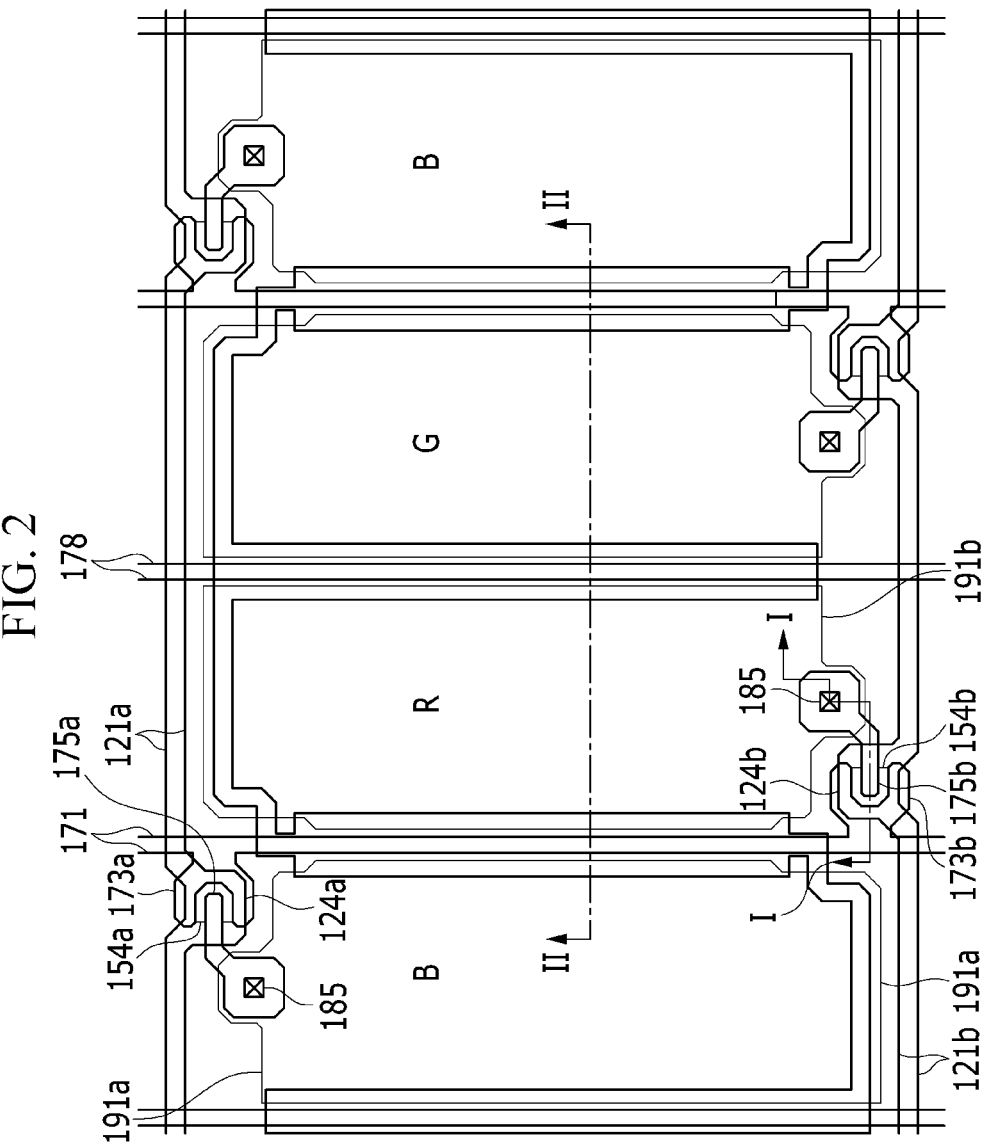
FIG. 2 is a top plan view of an exemplary embodiment of the curved display device according to an exemplary embodiment of the invention.
Figure 3:
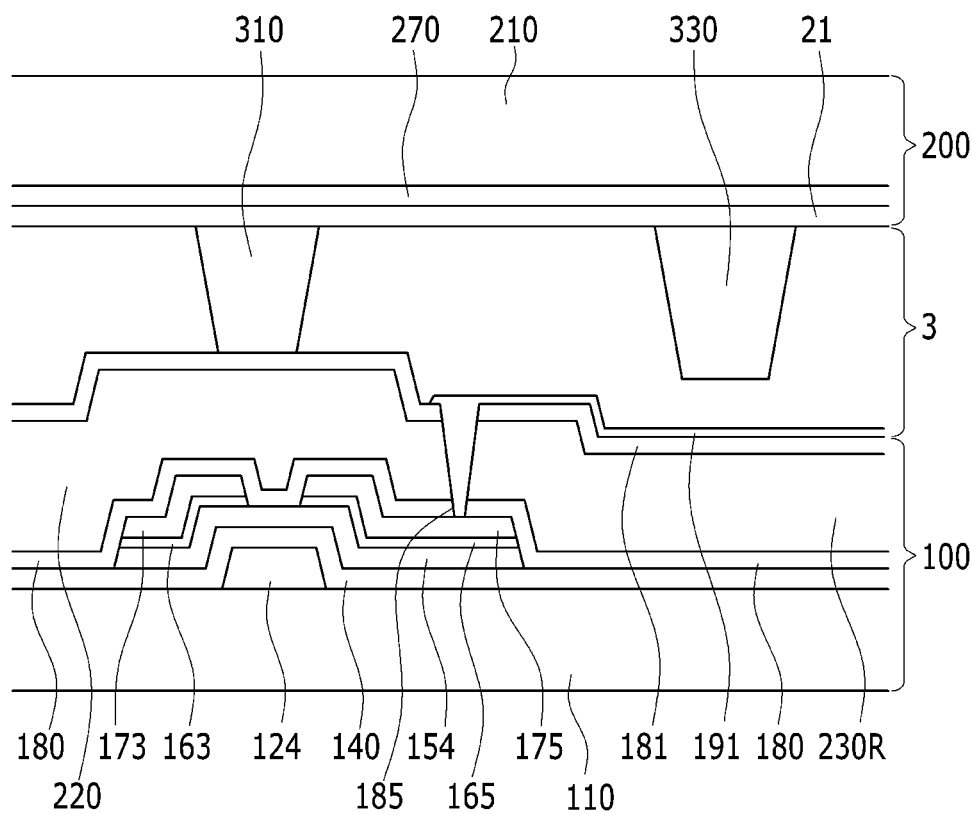
FIG. 3 is a cross-sectional view taken along line I-I of the curved display device of FIG. 2.
Figure 4:
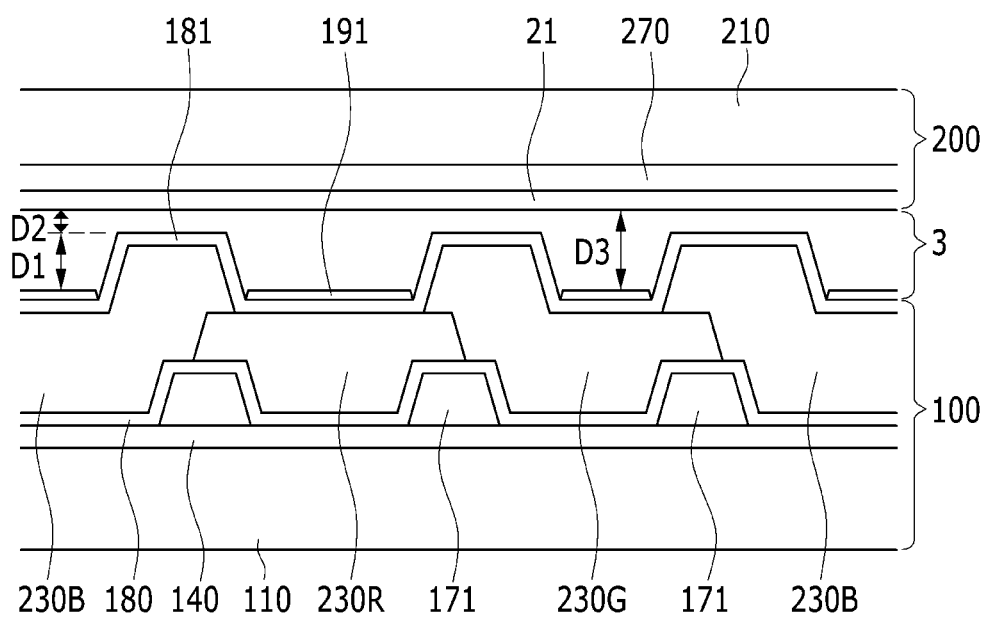
FIG. 4 is a cross-sectional view taken along line II-II of the curved display device of FIG. 2.
Figure 5:
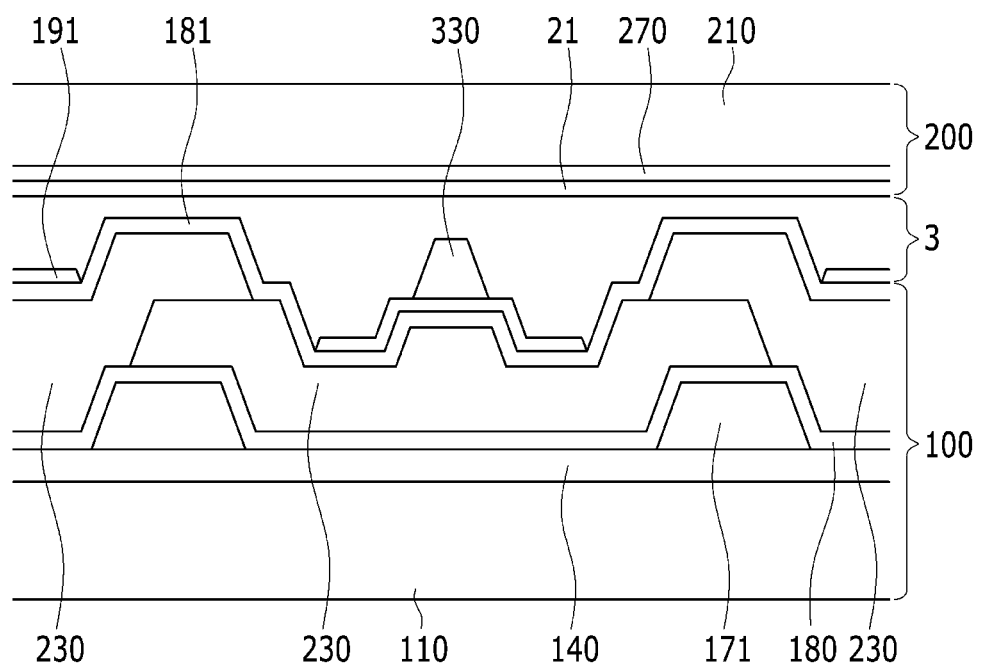
FIG. 5 is a cross-sectional view of an alternative exemplary embodiment of a curved display device according to the invention.
Figure 6:
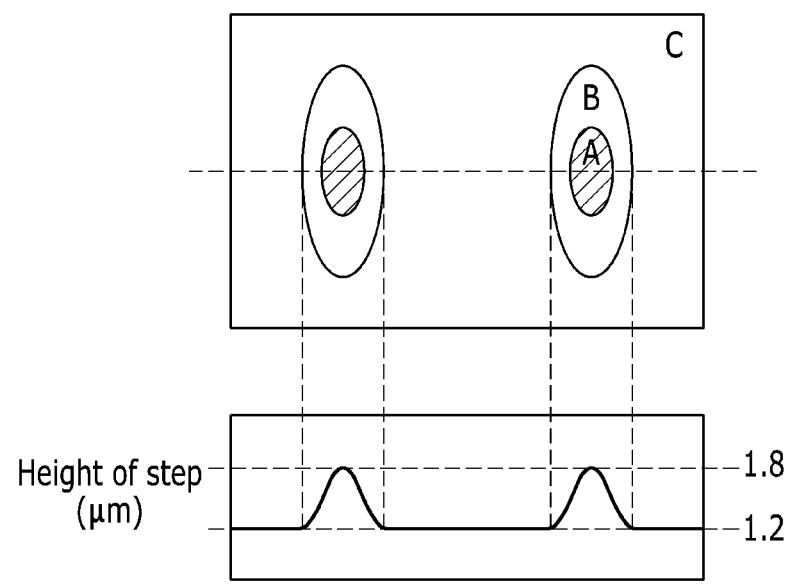
FIG. 6 is a schematic view illustrating a step height of an exemplary embodiment of a curved display device according to the invention.
Figure 7:
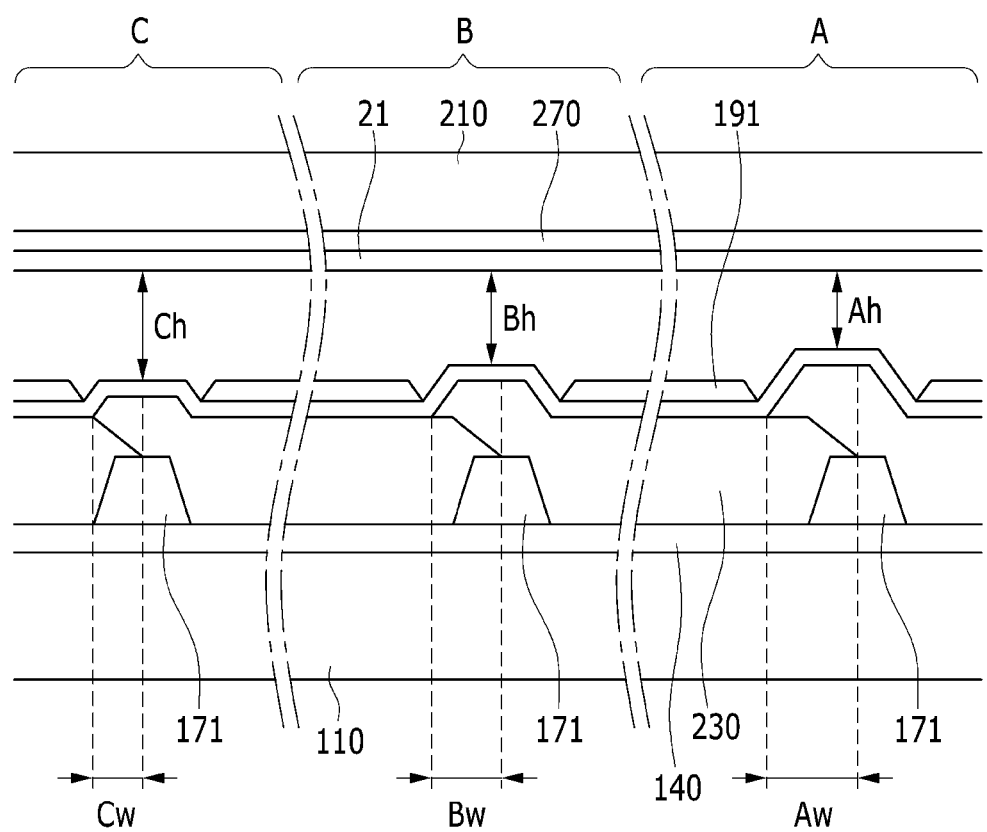
FIG. 7 is a cross-sectional view of the curved display device of FIG. 6.
Figure 8:
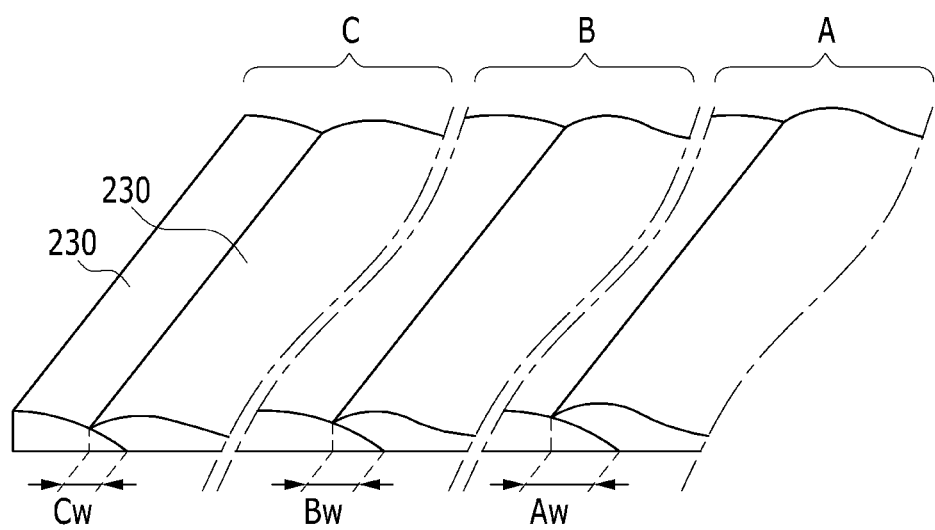
FIG. 8 is a perspective view of an exemplary embodiment of a color filter of FIG. 7.

FIG. 1 is a perspective view of an exemplary embodiment of a curved display device 10 according to the invention, FIG. 2 is a top plan view of the curved display device 10 of FIG. 1, FIG. 3 is a cross-sectional view taken along line I-I of the curved display device 10 of FIG. 2, FIG. 4 is a cross-sectional view taken along line II-II of the curved display device 10 of FIG. 2, FIG. 5 is a cross-sectional view of an alternative exemplary embodiment of a curved display device according to the invention, FIG. 6 is a schematic view illustrating a step height of an exemplary embodiment of a curved display device according to the invention, FIG. 7 is a cross-sectional view of the curved display device of FIG. 6, and FIG. 8 is a perspective view of an exemplary embodiment of a color filter of FIG. 7.

Referring to FIG. 1, an exemplary embodiment of the curved display device 10 includes a thin film transistor display unit 100 including a first insulation substrate 110, a common electrode display unit 200 including a second insulation substrate 210, and a liquid crystal layer 3 positioned between the thin film transistor display unit 100 and the common electrode display unit 200. In such an embodiment, the thin film transistor display unit 100 and the common electrode display unit 200 may be disposed opposite to, e.g., facing, each other.

In an exemplary embodiment, a sealant 300 is disposed at an edge of the first insulation substrate 110 and the second insulation substrate 210. The first insulation substrate 110 and the second insulation substrate 210 may be combined with each other by the sealant 300, and the sealant 300 may confine the liquid crystal layer 3 between the first insulation substrate 110 and the second insulation substrate 210.

The sealant 300 may include resin, initiator or filler, for example. The resin may include acryl resin, epoxy resin, urethane resin, or a combination thereof, and the initiator may include a photo initiator that absorbs light of a visible ray region or light of an ultraviolet ("UV") ray region or a thermal initiator that reacts to heat, for example. In one exemplary embodiment, for example, the photo initiator may be oxime base as an initiator that absorbs light having a wavelength of about 400 nanometers (nm) in the visible ray region. The filler may include core shell particles, inorganic planar filler or the like, for example.

The curved display device 10 may further include a fixing member (not shown) configured to fix the curved display device 10 to be in a predetermined shape, e.g., a curved shape, such that the thin film transistor display unit 100 including the first insulation substrate 110 and the common electrode display unit 200 including the second insulation substrate 210 have a predetermined curvature.

In such an embodiment, the curved display device 10 may be bent with a constant curvature radius.

In an exemplary embodiment, the fixing member may be formed at a predetermined position of an edge of the display device, and maintains an interval between two display units to be substantially constant. In such an embodiment, the curved display device 10 forms the curvature, and an interval between the display units may vary. In an exemplary embodiment, the display device maintains the substantially constant interval by the fixing member disposed at a predetermined position.

In an exemplary embodiment, the fixing member may be symmetrically positioned at an edge of the display device. In one exemplary embodiment, for example, the fixing member may be positioned at an edge corresponding to about ¼ point and about ¾ point of the display device in a horizontal direction (widthwise direction), but not being limited thereto. In such an embodiment, the fixing member may be disposed at any symmetric position.

In an exemplary embodiment, as illustrated in FIG. 1, the curved display device 10 includes the first insulation substrate 110 and the second insulation substrate 210, each curved with a substantially constant curvature. An observer observes an image displayed on a portion (e.g., a side or a surface) of the curved display device 10 that is concavely bent in a horizontal direction (left and right directions of the observer). In such an embodiment, the observer may observe the display device from a side of the second insulation substrate 210.

In such an embodiment, the first insulation substrate 110 and the second insulation substrate 210 are curved to have a substantially constant curvature radius. In such an embodiment, a center of the curvature radius of the horizontal direction is positioned on an outer side of the second insulation substrate 210, that is, in a direction toward the observer.

In an exemplary embodiment, a plurality of thin films is disposed on the first insulation substrate 110. In one exemplary embodiment, for example, a gate line 121, a thin film transistor element, a data line, a color filter and the like, may be disposed on the first insulation substrate 110.

In an exemplary embodiment, a plurality of thin films is disposed on the second insulation substrate 210. In one exemplary embodiment, for example, a common electrode and the like may be disposed on the second insulation substrate 210.

Referring to FIGS. 2 to 5, an exemplary embodiment of the curved display device 10 includes the thin film transistor display unit 100, the common electrode display unit 200 disposed opposite to, e.g., facing, the thin film transistor display unit 100, and the liquid crystal layer 3 disposed between the thin film transistor display unit 100 and the common electrode display unit 200.

Hereinafter, the thin film transistor display unit 100 will be described in detail.

A plurality of gate lines (121: 121*a*; and 121*b*) including gate electrodes (124: 124*a*; and 124*b*) is disposed on the first insulation substrate 110 including an insulating material such as glass or plastic, for example, and a gate insulating layer 140, a plurality of thin film transistor elements (154: 154*a* and 154*b*), a plurality of ohmic contacts 163 and 165, a plurality of data lines 171, and a plurality of drain electrodes (175: 175*a*; and 175*b*) are sequentially disposed thereon.

The gate lines 121 transfer a gate signal, and extend substantially in a first direction, e.g., a horizontal direction.

The data lines 171 transfer a data signal and extend substantially in a second direction substantially vertical to the first direction (e.g., a vertical direction) to intersect the gate line 121. Each data line 171 includes a plurality of source electrodes (173: 173*a*; and 173*b*) that extends toward the gate electrode 124. The drain electrode 175 is spaced apart from the data line 171 and faces the source electrode 173 with respect to the gate electrode 124.

In an exemplary embodiment, a voltage line 178 may extend substantially in the second direction on the first insulation substrate 110.

The thin film transistor element 154 is disposed on the gate electrode 124, and the ohmic contacts 163 and 165 are disposed on the thin film transistor element 154, between the thin film transistor element 154 and the data line 171 and between the thin film transistor element 154 and the drain electrode 175, thereby reducing contact resistance therebetween.

A single gate electrode 124, a single source electrode 173 and a single drain electrode 175 constitute a single thin film transistor ("TFT") together with the thin film transistor element 154, and a channel of the thin film transistor is formed in the thin film transistor element 154 between the source electrode 173 and the drain electrode 175.

In an exemplary embodiment, a first passivation layer 180 is disposed on the thin film transistor element 154, the source electrode 173, the drain electrode 175, the gate insulating layer 140 and the data lines 171.

In an exemplary embodiment, a light blocking member 220 may be disposed on the thin film transistor element 154, the source electrode 173, the drain electrode 175. According to another exemplary embodiment of the invention, the light blocking member 220 may be disposed on the gate line 121 and the data line 171, and color filters 230R, 230G and 230B may be disposed in a pixel region defined by the light blocking member 220.

In an exemplary embodiment, the light blocking member 220 may include carbon black of which content is about 7% or less. In an alternative exemplary embodiment, the light blocking member 220 may include only an organic black material such as perylene black or aniline black, for example, instead of including the carbon black. The light blocking member 220 has the infrared ray ("IR") transmittance of about 60% or more. Herein, a wavelength of the IR may be greater than or equal to about 1000 nm, or about 1500 nm or more.

A second passivation layer 181 is disposed on the color filters 230R, 230G and 230B. A contact hole 185 is defined in the passivation layer 181 and the color filters 230R, 230G and 230B and exposes the drain electrode 175.

The pixel electrodes (191: 191*a*; and 191*b*) are disposed on the passivation layer 181 and connected to the drain electrode 175 via the contact hole 185.

The common electrode display unit 200 faces the thin film transistor display unit 100, and includes the second insulation substrate 210 and a common electrode 270 disposed thereon. In an alternative exemplary embodiment, the common electrode 270 may be disposed on the thin film transistor display unit 100.

The liquid crystal layer 3 is disposed between the common electrode display unit 200 and the thin film transistor display unit 100.

In an exemplary embodiment, the liquid crystal layer 3 between the first insulation substrate 110 and the second insulation substrate 210 may be any type of liquid crystal layer 3, such as a twisted nematic ("TN") mode, a vertical aligned ("VA") mode, an in plane switching ("IPS") mode, a blue phase ("BP") mode, and the like, for example.

In an exemplary embodiment, an alignment layer 21 may be disposed in at least one of the first insulation substrate 110 and the second insulation substrate 210, and the alignment layer 21 may be rubbed or optically aligned in a predetermined direction. In an alternative exemplary embodiment, at least one of the liquid crystal layer 3 and the alignment layer 21 may include a photopolymer material.

An exemplary embodiment of the curved display device 10 will be described in greater detail with reference to FIG. 3. As described above with reference to FIG. 2, the gate electrode 124, the gate insulating layer 140, the thin film transistor element 154, the ohmic contact layers 163 and 165, and the source and drain electrodes 173 and 175 are sequentially disposed on the thin film transistor display unit 100 of the curved display device 10.

In an exemplary embodiment, the color filter 230 is disposed. The color filter (230: 230R; 230G; and 230B) may represent a primary color, such as red, green and blue, and may represent a primary color of each pixel by positioning a color filter or a light emitting layer for emitting light of a unique color on a region corresponding to each pixel. In one exemplary embodiment, the color filter may include a red color filter 230R, a green color filter 230G and a blue color filter 230B.

The color filters 230R, 230G and 230B may have a band shape and may be disposed between adjacent data lines 171. The color filters 230R, 230G and 230B may include a pigment and a photosensitive organic material representing red, green or blue.

When light is supplied from a light source (not shown), such as a backlight, disposed under the color filter 230, the color filter 230 transmits only light in a predetermined wavelength range corresponding to a color to be represented by the color filter 230. In an exemplary embodiment, the color filter 230 may include a first layer and a second layer having difference refractive indices, and thereby transmit only the light in the predetermined wavelength range corresponding to the color to be represented, and reflects light in a remaining wavelength, e.g., light having a wavelength outside the predetermined wavelength range. In one exemplary embodiment, for example, the red filter 230R transmits only light in a wavelength region of about 580 nanometers (nm) to about 780 nanometers (nm) and reflects all of the light in a remaining region thereof, the green filter 230G transmits only light in a wavelength region of about 450 nm to about 650 nm and reflects all of the light in a remaining region thereof, and the blue filter 230B transmits only light in a wavelength region of about 380 nm to about 560 nm and reflects all of the light in a remaining region thereof.

The common electrode display unit 200 may include the second insulation substrate 210, the common electrode 270 and the alignment layer 21.

A main column spacer 310 may be disposed between the thin film transistor display unit 100 and the common electrode display unit 200. The main column spacer 310 maintains an interval between the first insulation substrate 110 and the second insulation substrate 210 to be substantially constant, and to effectively prevent deformation and damage of a substrate that may occur due to a difference between internal pressure and external pressure of a vacuum vessel.

In such an embodiment, a sub-column spacer 330 may be disposed between the thin film transistor display unit 100 and the common electrode display unit 200. The sub-column spacer 330 may be disposed on the thin film transistor display unit 100 or the common electrode display unit 200. In an exemplary embodiment, where the sub-column spacer 330 is disposed on the thin film transistor display unit 100, the sub-column spacer 330 is spaced apart from the common electrode display unit 200 by a predetermined distance. In an alternative exemplary embodiment, where the sub-column spacer 330 is disposed on the common electrode display unit 200, the sub-column spacer 330 is spaced apart from the thin film transistor display unit 100 by a predetermined distance. In another alternative exemplary embodiment, the sub-column spacer 330 may be disposed on the thin film transistor display unit 100 and on the common electrode display unit 200.

In an exemplary embodiment, a plurality of sub-column spacers 330 may be included. In such an embodiment, where the plurality of sub-column spacers 330 is included, the predetermined distance from each sub-column spacer 330 to the thin film transistor display unit 100 or the common electrode display unit 200 may differ to achieve a stress distribution effect against various types of shear stresses. In one exemplary embodiment, for example, each pixel includes two sub-column spacers 330, including a first sub-column spacer at an interval of about 0.35 micrometer (μm) from the thin film transistor display unit 100 or the common electrode display unit 200 and a second sub-column spacer at an interval of about 0.2 μm from the thin film transistor display unit 100 or the common electrode display unit 200. Such different intervals may be determined by a height of the sub-column spacer 330 or a step compensation region defined by the color filter 230. In an exemplary embodiment, where the color filter 230 is substantially flat or planarized, the predetermined interval may be determined by the height of the sub-column spacer 330. In an exemplary embodiment, where the sub-column spacers 330 have substantially the same height from each other, the predetermined interval may be determined by different intervals between the thin film transistor display unit 100 or the common electrode display unit 200 based on the step compensation region of the color filter 230. The predetermined interval may be determined based on both the height of the sub-column spacer 330 and the step compensation region.

In such an embodiment, a spacer (e.g., the main column space 310 or the sub-column spacers 330) may include ceramic or glass, for example, or may have various shapes such as a circular column, a rectangular column, a wall type, and the like, for example.

FIG. 4 is a cross-sectional view taken along line II-II of the curved display device 10 of FIG. 2. FIG. 4 shows a step between a stepped region by an overlapping compensation region of the color filter 230 and a remaining region, which is a non-overlapping region, of the color filter 230, and a height difference between the stepped region by the overlapping compensation region and the non-overlapping region is referred to as a step height.

Referring to FIGS. 3 and 4, the thin film transistor display unit 100 includes the gate insulating layer 140 positioned on the first insulation substrate 110, and the source and drain electrodes 173 and 175 are positioned on the gate insulating layer 140. The first passivation layer 180 is positioned on the source and drain electrodes 173 and 175, and the color filter 230 is positioned on the passivation layer 180. The color filter 230 may include the red filter 230R, the green filter 230G, and the blue filter 230B. Referring to FIG. 4, in an exemplary embodiment of the invention, the red, green and blue may be repeatedly alternately arranged.

In such an embodiment, the red filter 230R is disposed on the passivation layer 180, and the red filter 230R and the green filter 230G overlap each other at the overlapping compensation region, to thereby define the stepped region having a step height D1. One of two color filters at the overlapping compensation region may be disposed in a lower portion of the overlapping compensation regions, and the other of the two color filters at the overlapping compensation region may be disposed in an upper portion of the overlapping compensation region. In one exemplary embodiment of the invention, as shown in FIG. 4, the red filter 230R may be disposed in the lower portion of the overlapping compensation regions.

In an exemplary embodiment, the red filter 230R and the green filter 230G overlap each other at the overlapping compensation region therebetween, to thereby define the step height D1, which is a height difference between the stepped region and the flat region, which is a non-overlapping region of the color filter 230 adjacent to the overlapping compensation region. In such an embodiment, an interval D2 between a surface of the thin film transistor display unit 100 corresponding to the overlapping compensation region and an opposing surface of the common electrode display unit 200 is shorter than an interval D3 between a surface of the thin film transistor display unit 100 corresponding to the non-overlapping region adjacent to the overlapping compensation region of the red filter 230R or the green filter 230G, and an opposing surface of the common electrode display unit 200. In an exemplary embodiment, a stepped region that defined by overlapped two adjacent color filters at the overlapping compensation region functions as a column spacer that maintains an interval such that a separate column spacer may be omitted therefrom.

Next, a portion of the green filter 230G and a portion of the blue filter 230B overlap each other, to thereby define the overlapping compensation region, and the overlapping compensation region defines another stepped region with a non-overlapping region. One of two color filters at the overlapping compensation region may be disposed in a lower portion of the overlapping compensation regions, and the other of the two color filters at the overlapping compensation region may be disposed in an upper portion of the overlapping compensation region. In one exemplary embodiment of the invention, the green filter 230G may be positioned on a lower of the overlapping region between the green filter 230G and the blue filter 230B.

In an exemplary embodiment, the green filter 230G and the blue filter 230B overlap each other at the overlapping compensation region therebetween, to thereby define the step height D1, which is a height difference between the stepped region and the flat region, which is the non-overlapping region of the green filter 230G and the blue filter 230B adjacent to the portion of the green filter 230G and the portion of the blue filter 230B that overlap each other at the overlapping compensation region. In such an embodiment, an interval between a surface of the thin film transistor display unit 100 corresponding to the overlapping compensation region and an opposing surface of the common electrode display unit 200 is shorter than an interval between a surface of the thin film transistor display unit 100 corresponding to the non-overlapping region adjacent to the overlapping compensation region of the green filter 230G or the blue filter 230B, and a surface of the facing common electrode display unit 200. In an exemplary embodiment, a stepped region that defined by overlapped two adjacent color filters at the overlapping compensation region functions as a column spacer that maintains an interval such that a separate column spacer may be omitted therefrom.

Next, a portion of the blue filter 230B and a portion of the red filter 230R overlap each other at the overlapping compensation region to thereby define an overlapping compensation region therebetween such that a non-overlapping region. One of two color filters at the overlapping compensation region may be disposed in a lower portion of the overlapping compensation regions, and the other of the two color filters at the overlapping compensation region may be disposed in an upper portion of the overlapping compensation region. In an exemplary embodiment of the invention, the red filter 230R may be positioned in the lower portion.

In an exemplary embodiment, a portion of the blue filter 230B and a portion of the red filter 230R overlap each other at the overlapping compensation region, to thereby define the step height D1 with a non-overlapping region adjacent to the overlapping compensation region. In such an embodiment, an interval between a surface of the thin film transistor display unit 100 corresponding to the overlapping compensation region and an opposite surface of the common electrode display unit 200 is shorter than an interval between a surface of the thin film transistor display unit 100 corresponding to the non-overlapping region of the blue filter 230B or the red filter 230R, and a surface of the facing common electrode display unit 200. In an exemplary embodiment, a stepped region that defined by overlapped two adjacent color filters at the overlapping compensation region functions as a column spacer that maintains an interval such that a separate column spacer may be omitted therefrom.

In an exemplary embodiment, as described above, each color filter 230 includes at least edge portions that overlap an edge portion of an adjacent color filter 230 to thereby define a stepped region corresponding to the overlapping compensation region. In such an embodiment, an overlapped portion of two adjacent color filters 230 at the overlapping compensation regions is the stepped region having a step height with a non-overlapping region adjacent to the overlapping compensation region.

In such an embodiment, as described above, the stepped region at the overlapping compensation region has the step height D1, which is a height of the stepped region at the overlapping compensation region from the non-overlapping region. Due to the step height D1, an interval D2 between the surface of the thin film transistor display unit 100 corresponding to the compensation region and the opposing surface of the common electrode display unit 200 is shorter than an interval D3 between the surface of the thin film transistor display unit 100 corresponding to the non-overlapping region and the opposing surface of the common electrode display unit 200.

The stepped region formed by overlapped portions of adjacent color filters 230 in the overlapping compensation region maintains an interval between the thin film transistor display unit 100 and the common electrode display unit 200. In such an embodiment, the interval between the thin film transistor display unit 100 including the first insulation substrate 110 and the common electrode display unit 200 including the second insulation substrate 210 may be maintained to be substantially constant by the stepped region, and a degradation in display quality may be effectively prevented from occurring due to irregularity of an interval that may be generated on the curved display device 10.

FIG. 5 is a cross-sectional view of an alternative exemplary embodiment of a curved display device according to the invention. The curved display device in FIG. 5 is substantially the same as the curved display device shown in FIGS. 1 to 4 except for the color filters 230. The same or like elements shown in FIG. 5 have been labeled with the same reference characters as used above to describe the exemplary embodiments of the curved display device shown in FIGS. 1 to 4, and any repetitive detailed description thereof may hereinafter be omitted or simplified.

Referring to FIG. 5, in an alternative exemplary embodiment, the thin film transistor display unit 100 may include the gate insulating layer 140 disposed on the first insulation substrate 110, and the source and drain electrodes 173, 175 are disposed on the gate insulating layer 140. The first passivation layer 180 is disposed on the data lines 171, and the color filter 230 is disposed on the first passivation layer 180. The color filter 230 may include a red filter, a green filter, and a blue filter, and includes a stepped region which is defined by the overlapping compensation regions of the adjacent color filters 230 and functions as a main column spacer. An interval between the thin film transistor display unit 100 and the common electrode display unit 200 at the stepped region is substantially small, for example, may be in a range of about 0.3 μm to about 0.9 μm.

In such an embodiment, the sub-column spacer 330 may be further disposed on the color filter 230. The sub-column spacer 330 may be disposed between overlapping compensation regions of each pixel. In an exemplary embodiment, a plurality of sub-column spacers 330 may be disposed in each pixel. The sub-column spacer 330 may be disposed on the color filter 230 between overlapping compensation regions of each pixel, or may be disposed on the common electrode display unit 200. In an alternative exemplary embodiment, the sub-column spacers 330 may be disposed on both the color filter 230 and the common electrode display unit 200.

In an exemplary embodiment, where at least two sub-column spacers 330 are disposed in each pixel, an interval by each sub-column spacer 330 may be different from each other.

In an exemplary embodiment, where a non-overlapping region other than the overlapping compensation region of the color filter 230 is substantially flat, at least two sub-column spacers 330 are positioned on the non-overlapping region, and each sub-column spacer 330 may have a different size. In such an embodiment, the interval between the sub-column spacers 330 and the color filter 230 or the common electrode display unit 200 may differ from each other due to the different size of each sub-column spacer 330.

According to another exemplary embodiment, each sub-column spacer 330 has the same size, and the interval between the sub-column spacers 330 and the color filter 230 or the common electrode display unit 200 may differ from each other by a step compensation region defined in the non-overlapping region of the color filter 230. In another alternative exemplary embodiment, the interval between the sub-column spacers 330 and the color filter 230 or the common electrode display unit 200 may differ from each other by the different size of each sub-column spacer 330 and by the step compensation region defined in the non-overlapping region of the color filter 230.

According to an exemplary embodiment of the invention, the stepped region may have different step heights in the curved display device. Hereinafter, the stepped region will be described in greater detail with reference to FIGS. 6 through 8.

In an exemplary embodiment of a curved display unit, a stress concentration occurs in the curved display device 10 due to a curvature of a curved shape thereof. In an exemplary embodiment, the curved display device may include a fixing member, and the stress concentration occurs in a vertical direction (e.g., a lengthwise direction) of the display unit, for example, the thin film transistor display unit 100 and the common electrode display unit 200 at a point at which the fixing member is positioned. In such an embodiment, the interval between the thin film transistor display unit 100 and the common electrode display unit 200 may not be effectively maintained at the point at which the stress concentration occurs.

In an exemplary embodiment, as illustrated in FIG. 6, in a case in which the fixing member is included at a ¼ point and a ¾ point of the display unit in a longitudinal direction (e.g., the horizontal direction) of the display unit, the display unit may be divided into a center region corresponding to a region with oblique lines in FIG. 6, on which the stress is mostly concentrated, a region surrounding the center region and which is the next highest stress, and a remaining region. As shown in FIG. 6, the highest stress concentration occurs at the point at which the fixing member is positioned, and the stress gradually decreases as moving toward both side ends of the display unit from the point at which the fixing member is positioned.

In an exemplary embodiment, the stress concentration may occur in the display device as illustrated in FIG. 6, and a step height may be provided in the display device as illustrated in FIG. 7. In such an embodiment, a stepped region having a step height $A_h$, which is highest, is disposed in a region A, and the step height is gradually decreased substantially in proportion to the stress concentration in an order of a region B having a step height $B_h$ and a region C having a step height $C_h$.

The step height of the stepped region may be calculated based on the following Equation 1.

$$A = \frac{B}{0.1} - 4.5 \qquad \text{Equation 1}$$

In Equation 1, A denotes a value of stress in kilogram force (kgf) and B denotes a value of the step height in micrometer (μm). In one exemplary embodiment, for example, when the stress at a point of the display device is about 7.5 kgf, the step height at the point of the display device may be about 1.2 μm.

In an exemplary embodiment, the step height of the stepped region calculated by Equation 1 may be in a range of about 1.2 μm to about 1.9 μm. In an exemplary embodiment, the step height may be controlled by adjusting a width of the overlapping compensation region. In an exemplary embodiment, as illustrated in FIG. 8, the step height increases (e.g., $C_h<B_h<A_h$) based on an increase in the width (e.g., $C_w<B_w<A_w$). That is, the step height decreases, as the width decreases. In an exemplary embodiment, a ratio of an interval between the thin film transistor display unit 100 and the common electrode display unit 200 at a non-overlapping region with respect to the step height of the stepped region may be in a range of about 0.4 to about 0.6. In such an embodiment, the interval between the thin film transistor display unit 100 and the common electrode display unit 200 at the non-overlapping region may be, for example, about 3.0 μm.

In an exemplary embodiment, an interval between a surface of the thin film transistor display unit 100 and a surface of the common electrode display unit 200 at the non-overlapping region may be in a range of about 0.3 μm to about 0.9 μm, for example, may be about 0.3 μm.

The step height of the stepped region may vary based on an overlapping length of the overlapping compensation region. In an exemplary embodiment, when a width of the overlapping compensation region between adjacent color filters is about 9 μm, the step height of the stepped region on the overlapping compensation region may be about 1.6 μm. As the width of the overlapping compensation region between the color filters increases, the step height of the formed stepped region increases. Accordingly, in an exemplary embodiment, the overlapping width of the overlapping compensation region may be controlled to thereby control the step height of the stepped region.

In an exemplary embodiment, as described above, the curved display device includes the fixing member (not shown) to maintain the curvature to be substantially constant. As described above, in such an embodiment, a shear stress is concentrated on a region on which the fixing member is positioned. The fixing member may be symmetrically positioned based on a center of the curved display device. The stepped region defined by the overlapping compensation region may also be symmetrically disposed based on the center of the curved display device. In an exemplary embodiment, a shear stress of a display device may be substantially symmetrically concentrated, and the stepped region by the overlapping compensation region is thereby substantially symmetrically disposed in correspondence to the shear stress.

In an exemplary embodiment, the height of the stepped region gradually increases corresponding to a continuous and gradual increase in the shear stress, or the height of the stepped region gradually decreases corresponding to a continuous and gradual decrease in the shear stress.

FIG. 6 shows one exemplary embodiment, where the stress concentration generally occurs at a point at which the fixing member is positioned in the curved display device, but the invention is not limited thereto.

In an exemplary embodiment, a stress distribution map of the display device may be obtained by analyzing a stress map of the display device. In such an embodiment, a stepped region having a high step height is disposed on a portion on which the stress is greatly concentrated and a stepped region having a low step height is disposed on a portion on which the stress is relatively less concentrated based on the stress distribution map. In such an embodiment, the step height varies corresponding to the stress, and the step height is controlled by an overlapping width of the color filter, that is, an overlapping width of the color filter increases in a region having a high step height, and the overlapping width of the color filter decreases in a region having a low step height.

Hereinafter, a liquid crystal margin and a smear characteristic of an exemplary embodiment of a curved display device according to the invention will be described with reference to FIG. 9.

Figure 9:
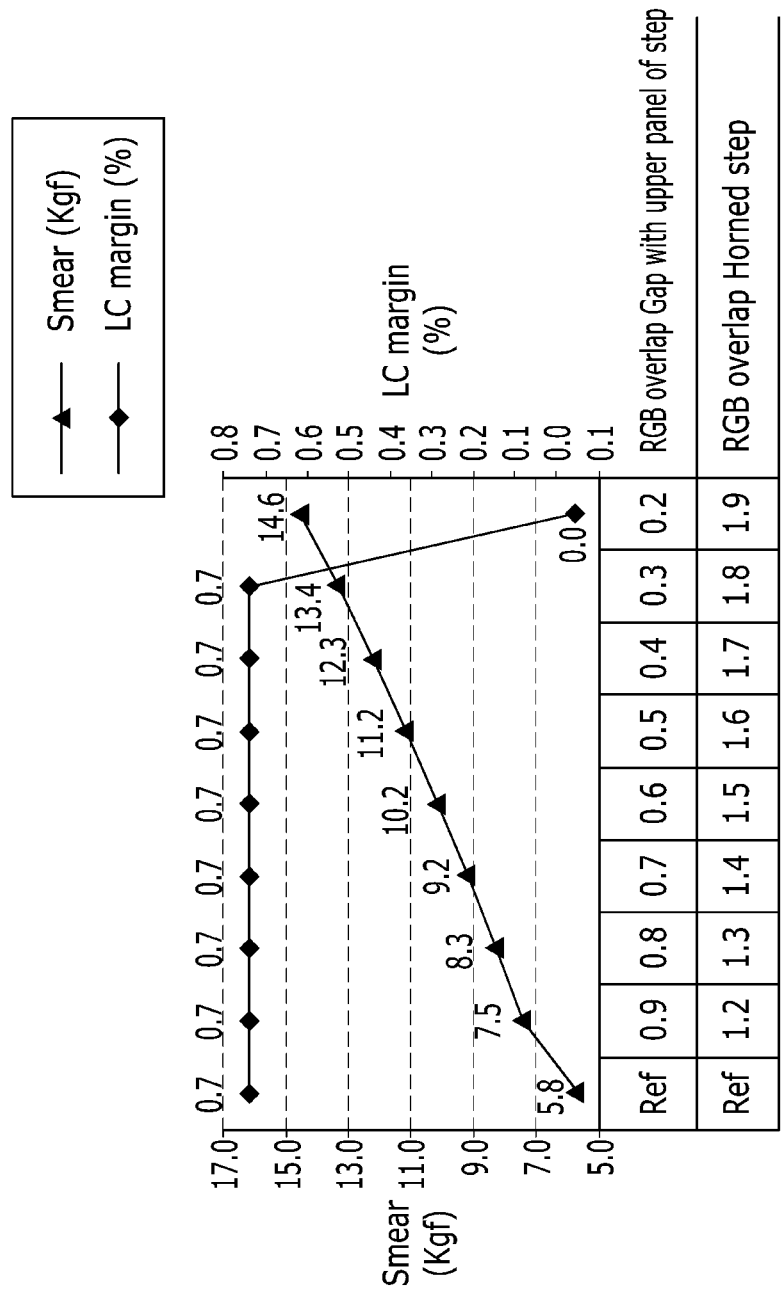
FIG. 9 is a graph showing results of a performance test on an exemplary embodiment of the invention.

FIG. 9 is a graph showing results of a performance test on an exemplary embodiment of the invention.

As shown in FIG. 9, as for the smear characteristic, an inspector applied a predetermined pressure to the curved display device in which the interval by the step varied, and then proceeded with an evaluation with naked eyes, and thereby verified that the portion to which the pressure was applied was observed as a black gap.

Referring to FIG. 9, the smear characteristic had a tendency to increase according to a decrease in the interval by the stepped region.

As for the liquid crystal margin effect, when the interval by the stepped region decreased down to about 0.3 μm, the liquid crystal margin was not affected. Here, when the interval by the stepped region is about 0.2 μm, the liquid crystal margin showed a very low value and thus, was verified to be inappropriate for the curved display device.

As described above, as for the smear characteristic, the stepped region may improve the smear characteristic according to a decrease in the interval. However, as for the liquid crystal margin characteristic, when the interval decreases to be less than about 0.3 μm, the liquid crystal margin may not be effectively secured.

Accordingly, in an exemplary embodiment of the display device including the stepped region by the overlapping compensation region, the interval may be equal to or greater than about 0.3 μm.

Hereinafter, an exemplary embodiment of a manufacturing method of the curved display device according to the invention will be described with reference to FIG. 10.

Figure 10:
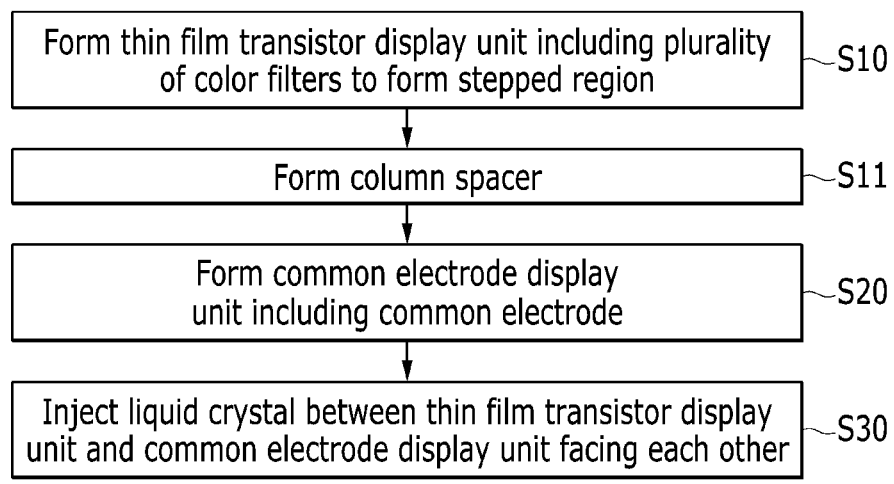
FIG. 10 is a flowchart illustrating an exemplary embodiment of a manufacturing method of a curved display device according to the invention.

FIG. 10 is a flowchart illustrating an exemplary embodiment of a manufacturing method of a curved display device according to the invention.

In an exemplary embodiment, the manufacturing method of the curved display device includes providing, e.g., forming, a thin film transistor display unit including a first insulation substrate and a plurality of color filters (S10), providing, e.g., forming, a second insulation substrate including a common electrode (S20), and providing, e.g., injecting, liquid crystal between the first insulation substrate and the second insulation substrate that face each other (S30). FIG. 10 shows an exemplary embodiment of a manufacturing method of a curved display device, in which the plurality of color filters 230 are disposed on the first insulation substrate, but the invention is not limited thereto. In an exemplary embodiment, the plurality of color filters 230 may be provided, e.g., formed, on the second insulation substrate in which the common electrode is disposed.

In an exemplary embodiment, the providing the thin film transistor display unit including the first insulation substrate and the color filters may include providing a plurality of gate lines 121 including the gate electrode 124 on the first insulation substrate 110 including an insulating material such as glass or plastic, for example, and sequentially providing the gate insulating layer 140, the plurality of thin film transistor elements 154, the plurality of ohmic contacts 163 and 165, the plurality of data lines 171, and the plurality of drain electrodes 175 on the first insulation substrate.

In an exemplary embodiment, the providing the thin film transistor display unit including the first insulation substrate and the color filters may further include providing the color filters 230, e.g., providing the red filter 230R, the green filter 230G and the blue filter 230B to overlap each other.

In such an embodiment, the overlapping compensation region of the red filter 230R and the overlapping compensation region of the green filter 230G overlap each other, to thereby form a stepped region.

In such an embodiment, the blue filter 230B is provided such that overlapping compensation regions positioned at both ends of the blue filter 230B overlap the overlapping compensation region of the green filter 230G and the overlapping compensation region of the red filter 230R, respectively, to thereby form the stepped region.

In such an embodiment, the step height of the stepped region by the overlapping compensation region may be in a range of about 1.2 μm to about 1.8 μm, for example, may be about 1.8 μm.

The stepped region is provided in a position in the display device corresponding to the shear stress of the display device. In an exemplary embodiment, as illustrated in FIGS. 7 and 8, a high stepped region is provided at a point A at which the concentration of the shear stress of the display device is relatively high, and a low stepped region is provided at a point C at which the concentration of the shear stress is relatively low. Therefore, the step height is configured to gradually increase or decrease in correspondence to the shear stress by analyzing the overall shear stress applied to the display device.

In one exemplary embodiment, for example, the shear stress of the display device is generally symmetrically concentrated with respect to the display device, and the stepped region defined by the overlapping compensation region is thereby symmetrically provided in correspondence to the shear stress. In such an embodiment, the height of the stepped region also gradually increases or decrease based on a continuous and gradual increase or decrease in the shear stress.

In an exemplary embodiment, as shown in FIG. 10, the manufacturing method of the curved display device may further include providing, e.g., forming, a column spacer (e.g., the main spacer 310) on the first insulation substrate on which the thin film transistor element is provided, or the second insulation substrate corresponding thereto.

In such an embodiment, the providing the color filter 230 may further include providing a step compensation region of the color filter 230 at opposing ends of the non-overlapping region of the color filter 230.

In an exemplary embodiment, the manufacturing method of the curved display device may further include providing the sub-column spacer 330 on the step compensation region. The sub-column spacer 330 may be positioned on any one of the thin film transistor display unit 100 and the common electrode display unit 200. When the sub-column spacer 330 is provided on the thin film transistor display unit 100, the sub-column spacer 330 is spaced apart from the common electrode display unit 200 by a predetermined distance. When the sub-column spacer 330 is provided on the common electrode display unit 200, the sub-column spacer 330 is spaced apart from the thin film transistor display unit 100 by a predetermined distance.

In one exemplary embodiment, for example, as illustrated in FIG. 6, the sub-column spacer 330 may be provided on the thin film transistor display unit 100, and a predetermined distance between the plurality of sub-column spacers 330 and the common electrode display unit 200 on the formed step compensation region may be substantially the same as or different from each other. When the predetermined distance is different, a distribution effect of the shear stress may be improved.

In an exemplary embodiment of the invention, the shear stress is distributed through the stepped region corresponding to overlapping between the color filters 230, but the invention is not limited thereto. According to another exemplary embodiment of the invention, a stepped region may be configured through the stepped region provided by overlapping between the light blocking member 220 positioned on the first insulation substrate 110 and the color filter 230, overlapping between a flattening organic layer and the color filter 230, or overlapping between the light blocking member and a coloring column spacer. In such an embodiment, other constituent elements are substantially similar to the configuration of the exemplary embodiments of the curved display device described herein, and thus, any repetitive detailed description thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A curved display device, comprising:
    a thin film transistor display unit comprising a first insulation substrate;
    a common electrode display unit disposed opposite to the thin film transistor display unit, and comprising a second insulation substrate;
    a liquid crystal layer disposed between the thin film transistor display unit and the common electrode display unit; and
    a plurality of color filters disposed on the first insulation substrate or the second insulation substrate,
    wherein each color filter defines an overlapping compensation region, which overlaps an adjacent color filter, and a non-overlapping region, which does not overlap the adjacent color filter,
    the overlapping compensation region defines a stepped region having a step height with the non-overlapping region,
    the step height of the stepped region defined by the overlapping compensation region varies according to a stress thereon, and
    the step height of the stepped region increases as the width of the overlapping compensation region increases between the plurality of color filters.

2. The curved display device of claim 1, wherein the step height of the stepped region is calculated based on the following equation:

$$A = \frac{B}{0.1} - 4.5,$$

wherein A denotes a value of the stress expressed in kilogram force, and B denotes a value of the step height expressed in micrometer.

3. The curved display device of claim 2, wherein the step height of the stepped region is in a range of about 1.2 micrometers to about 1.9 micrometers.

4. The curved display device of claim 1, wherein a ratio of an interval between the thin film transistor display unit and the common electrode display unit at the non-overlapping region with respect to the step height of the stepped region is in a range of about 0.4 to about 0.6.

5. The curved display device of claim 4, wherein an interval between the thin film transistor display unit and the common electrode display unit at the stepped region is in a range of about 0.3 micrometer to about 0.9 micrometer.

6. The curved display device of claim 1, further comprising:
    a fixing member configured to maintain an interval between the thin film transistor display unit and the common electrode display unit,
    wherein the step height of the stepped region gradually varies based on the fixing member.

7. The curved display device of claim 6, wherein the stress is concentrated in a longitudinal direction of the curved display device from a position at which the fixing member is disposed.

8. The curved display device of claim 1, further comprising:
    a thin film transistor element disposed on the first insulation substrate; and
    a main column spacer disposed on a region between the first insulation substrate and the second insulation substrate and in a position at which the thin film transistor element is disposed.

9. The curved display device of claim 8, wherein the color filters comprise a step compensation region, and the curved display device further comprises a sub-column spacer disposed on the step compensation region.

10. The curved display device of claim 1, wherein each color filter comprises a plurality of overlapping compensation regions.

11. The curved display device of claim 1, wherein an interval between the thin film transistor display unit and the common electrode display unit is substantially constant.

12. The curved display device of claim 11, wherein the second insulation substrate is disposed to be inward based on a curvature radius thereof, and the second insulation substrate is less compressed in a longitudinal direction of the curved display device than the first insulation substrate.

13. A curved display device, comprising:
    a thin film transistor display unit comprising a first insulation substrate;
    a common electrode display unit disposed opposite to the thin film transistor display unit, and comprising a second insulation substrate;
    a liquid crystal layer disposed between the thin film transistor display unit and the common electrode display unit;
    a plurality of color filters disposed on the first insulation substrate or the second insulation substrate, wherein each color filter comprises an overlapping compensation region, which overlaps an adjacent color filter, and a non-overlapping region, which does not overlap the adjacent color filter; and a light blocking member disposed adjacent to each color filter and overlapping the overlapping compensation region of each color filter, wherein the light blocking member and the overlapping compensation region, which overlap each other, define a stepped region having a step height with the non-overlapping region, wherein the step height of the stepped region defined by the overlapping compensation region varies according to a stress thereon, and wherein the step height of the stepped region increases as the width of the overlapping compensation region increases between the plurality of color filters.

14. The curved display device of claim 13, wherein the step height of the stepped region is calculated based on the following equation:

$$A = \frac{B}{0.1} - 4.5,$$

wherein A denotes a value of the stress expressed in kilogram force, and B denotes a value of the step height expressed in micrometer.

15. The curved display device of claim 14, wherein the step height of the stepped region is in a range of about 1.2 micrometers to about 1.9 micrometers.

16. The curved display device of claim 13, wherein a ratio of an interval between the thin film transistor display unit and the common electrode display unit at the non-overlapping region with respect to the step height of the stepped region is in a range of about 0.4 to about 0.6.

17. The curved display device of claim 16, wherein the interval between the thin film transistor display unit and the common electrode display unit at the stepped region is in a range of about 0.3 micrometer to about 0.9 micrometer.

18. A manufacturing method of a curved display device, the method comprising:
providing a thin film transistor display unit comprising a first insulation substrate and a plurality of color filters;
providing a common electrode display unit comprising a second insulation substrate and a common electrode to be opposite to the thin film transistor display unit; and
providing liquid crystal between the thin film transistor display unit and the common electrode display unit,
wherein
adjacent color filters of the color filters overlap each other such that an overlapping compensation region is provided between the adjacent color filters,
the overlapping compensation region defines a stepped region having a step height with a non-overlapping region of the color filters,
the step height of the stepped region defined by the overlapping compensation region varies according to a stress thereon, and
the step height of the stepped region increases as the width of the overlapping compensation region increases between the plurality of color filters.

19. The method of claim 18, wherein the step height of the stepped region is calculated based on the following equation:

$$A = \frac{B}{0.1} - 4.5,$$

wherein A denotes a value of the stress in kilogram force, and B denotes a value of the step height in micrometer.

20. The curved display device of claim 19, wherein the step height of the stepped region is in a range of about 1.2 micrometers to about 1.9 micrometers.

21. The method of claim 18, wherein a ratio of an interval between the thin film transistor display unit and the common electrode display unit at the non-overlapping region with respect to the step height of the stepped region is in a range of about 0.4 to about 0.6.

22. The method of claim 21, wherein an interval between the thin film transistor display unit and the common electrode display unit at the stepped region is in a range of about 0.3 micrometer to about 0.9 micrometer.

23. The method of claim 18, further comprising:
providing a thin film transistor element on the first insulation substrate; and
providing a main column spacer between the first insulation substrate and the second insulation substrate and in a position, at which the thin film transistor element is provided.

24. The method of claim 23, further comprising:
providing a step compensation region using the color filter; and
providing a sub-column spacer on the step compensation region.

* * * * *